Patented Sept. 5, 1922.

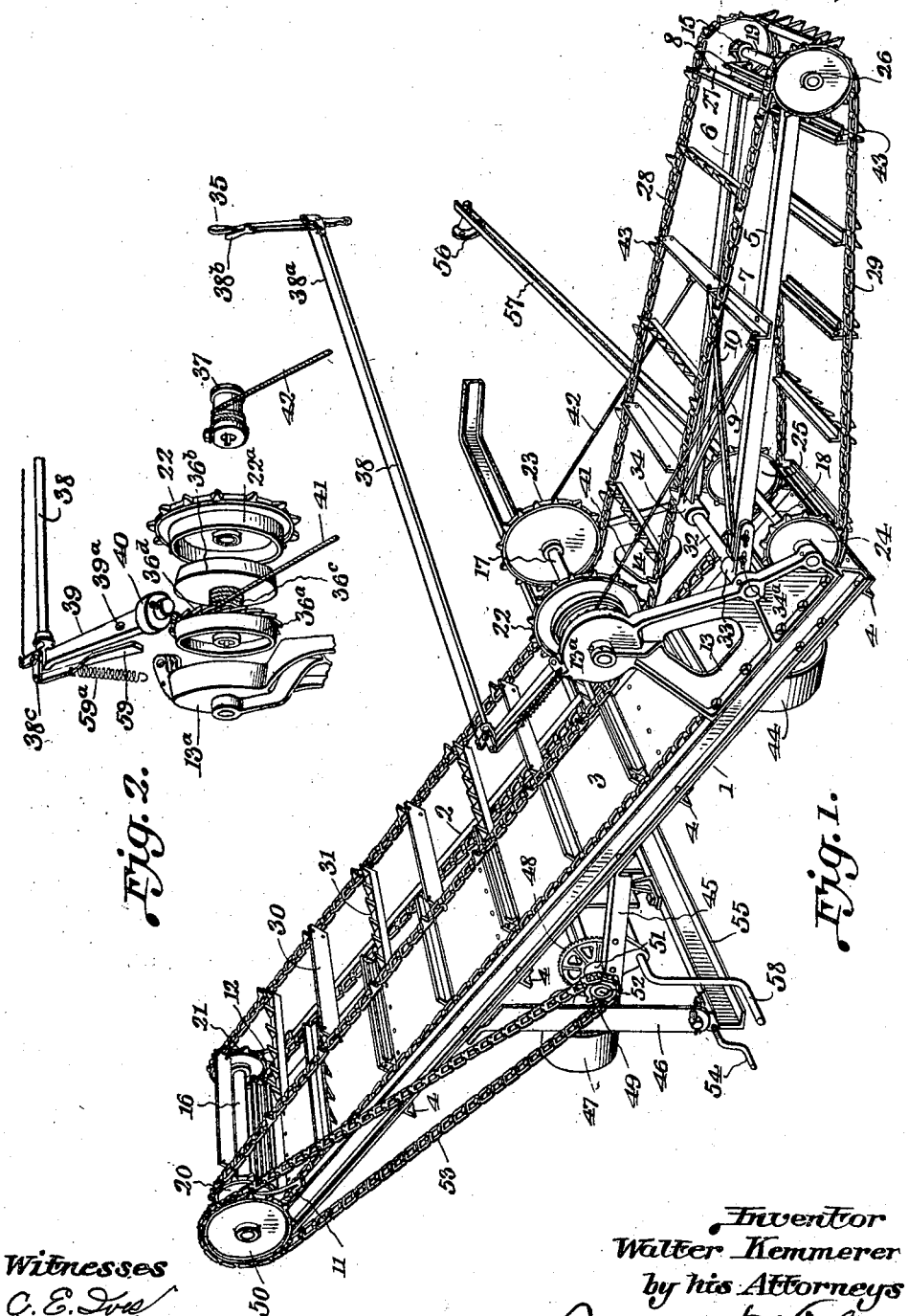

1,428,240

UNITED STATES PATENT OFFICE.

WALTER KEMMERER, OF CLINTON, WISCONSIN.

LOADING APPARATUS.

Application filed December 10, 1921. Serial No. 521,367.

*To all whom it may concern:*

Be it known that I, WALTER KEMMERER, a citizen of the United States, residing at Clinton, in the county of Rock and State of Wisconsin, have invented certain new and useful Improvements in Loading Apparatus, of which the following is a specification.

This invention relates to machines for loading manure, gravel, sand, coal, etc., and has for an object to provide a practical labor-saving device for initially removing the material from the pile or hill where it has been deposited naturally or artificially, elevating the same, and depositing it into a suitable vehicle for hauling.

Inasmuch as the materials handled are usually deposited over large areas and in deep strata, another object of the invention is to provide a machine that will cover a relatively large area at one setting, will be adjustable for depth of material, and can also be easily reset.

Another object of the invention is to provide a machine that can be readily attached to a farm tractor or detached therefrom; that will take its operating power from the belt of the tractor, and can have its position changed relative to the pile of material from the movement of the tractor.

These and other objects are set forth in the following detailed description and covered by the appended claims.

Figure 1 is a perspective view of the loading machine, and Figure 2 is a separated view of the details of the clutch and brake mechanism.

The loading machine herein disclosed consists of two main frame parts, one of which is normally connected to the tractor and occupies a fixed inclined position and is hereinafter termed the elevator. The other frame part is pivotally carried by the elevator and normally occupies a substantially horizontal position. It is hereinafter termed the boom.

The frame of the elevator consists of two parallel beams 1 and 2, a flat bottom 3, and transverse cleats 4. The frame of the boom comprises two parallel beams 5 and 6, transverse cleats 7 and 8, and diagonal braces 9 and 10.

The elevator frame has two pairs of bearing brackets 11, 12 and 13, 14; and the boom has a bracket 15. Mounted in these brackets are transverse shafts 16, 17, 18 and 19. At the ends of each shaft are two sprocket wheels, these wheels being designated 20, 21, 22, 23, 24, 25, 26 and 27. An endless chain conveyor comprising two chains 28 and 29 passes around these sprockets. The conveyor is provided with a plurality of alternating drags 30 and rakes 31.

The boom frame is pivotally mounted to swing in a vertical plane by means of two bearings 33 and 34 on a horizontal shaft 32 mounted in the brackets 13 and 14 on the elevator. The shaft 32 is so located with reference to the axes of the shafts 17 and 18 that the boom may be raised and lowered without varying the tension of the conveyor chains 28 and 29. The boom is raised, lowered or held as desired by means of the device shown in detail in Figure 2, which will now be described.

The idler sprockets 22 and 23 are both loose on the sprocket shaft 17, and the sprocket 22 has a cone clutch drum $22^a$ cast integral therewith or fixed thereto. The cable drum $36^c$ is cast integral with or rigidly fixed to a cone clutch spider $36^b$, and a cone brake spider $36^a$ is feather keyed to the idler shaft 17 but slides laterally upon it. The cone brake spider is provided with ratchet teeth $36^d$ with which is adapted to engage a spring latch 59.

An operating lever 35 is located adjacent the driver's seat, and operates a rod 38 connected to a clutch lever 39 pivoted at $39^a$ and carrying a roller 40 adapted to bear against the inner surface of the clutch spider $36^b$ causing it to engage the clutch drum $22^a$, and thereby cause the rotation of the shaft 17 as the sprockets 22 and 23 rotate. A cable drum 37 is keyed tight to the shaft 17, and cables 41 and 42 connected to the boom frame are wound upon the drums.

The operating lever 35 has a finger piece $38^b$ adapted to operate the spring detent 59 through connections comprising a wire $38^a$ and a bell crank $38^c$. The detent 59 is normally held in engagement with the teeth $36^a$ by a spring $59^a$. When the boom has been raised to the desired height, the operator releases the handle 35 whereupon the clutch is disengaged and the detent 59 brought into operation holding the parts from return movement.

When it is desired to lower the boom, the clutch is first set by a backward pull on the control lever, the latch or detent 59 is released, and the clutch surfaces may be allowed to operate as a brake by varying the pull on said lever, thus permitting the weight of the boom to unwind the cables.

The alternation of the drags 30 and the rakes 31 in the endless conveyor is for the special purpose of loading manure. The toothed rakes 31 tear the manure loose while the plain drags 30 scrape up cleanly all the loose manure that is not carried forward by the rakes. The speed of the conveyor is sufficient to ordinarily throw off by centrifugal force such manure as may cling to the teeth of the rakes when they pass over the top adjacent the sprockets 20 and 21.

Other forms of loading devices may be substituted for the rakes 31 and drags 30 when desired to load other material for which these special forms may not be adapted.

In order that the chains may not hinder the progress of the boom downward through the pile, they are provided at intervals with toothed links 43. Chain guides may be provided wherever desired. The brackets 11 and 12, and bearings 15, 33 and 34 may be made adjustable as shown at 34ª for example, for the purpose of tightening the chains 28 and 29.

A wheel 44 and appropriate framework 45 and 46 support the whole of the above described structure, the wheel resting on the ground and the framework being connected to the tractor as hereinafter set forth.

The power for the operation of the machine is transmitted from the belt pulley of the tractor to the upper shaft 16 in the following manner. A pulley 47 is mounted on a horizontal axis parallel with the axis of the belt pulley on the tractor and this pulley is geared to a bevel gear 48 on the shaft 52 mounted in bearings 51 on the frame piece 45. On this shaft is a small sprocket wheel 49 and on the shaft 16 is a large sprocket wheel 50 and the two wheels 49 and 50 are connected by a sprocket chain 53. The driving belt from the tractor belt pulley may be tightened by means of the tightener 54 which operates by shifting the whole elevator along the supporting beam 55.

The supporting beam 55 is attached to the tractor in any desired manner and the hub bearing 56 is bolted to the hub of the rear tractor wheel and is connected to the framework by a bar 57. The crank extension 58 is provided for starting the motor, since the whole device is located in front of the tractor and transversely thereof.

The operation of the machine is clear from the above description. The attachment may be moved from place to place as desired with the tractor, and is operated from the tractor. Various features may be modified to adapt the invention for attachment to different types of tractors or for different kinds of work.

I claim as my invention:

1. Loading apparatus comprising an inclined elevator member, a boom member, guides on each of said members, and an endless articulated conveyor passing about said guides, said boom member being pivoted to the elevator member to swing in a vertical plane in such a manner that the length and tension of the endless conveyor is not affected by such movement.

2. Loading apparatus comprising an inclined elevator member, a boom member, sprocket wheels on each of said members, and an endless articulated conveyor passing about said wheels, said boom member being pivoted to the elevator member to swing in a vertical plane in such a manner that the length and tension of the endless conveyor is not affected by such movement.

3. Loading apparatus comprising an inclined elevator member, a boom member, guides on each of said members, an endless articulated conveyor passing about said guides, said boom member being pivoted to the elevator member to swing in a vertical plane in such a manner that the length and tension of the endless conveyor is not affected by such movement, and means for raising and lowering the boom at will.

4. Loading apparatus comprising an inclined elevator member, a boom member, guides on each of said members, an endless articulated conveyor passing about said guides, said boom member being pivoted to the elevator member to swing in a vertical plane in such a manner that the length and tension of the endless conveyor is not affected by such movement, and means for raising and lowering the boom at will comprising a manually operated clutch and brake member.

5. Loading apparatus comprising an inclined elevator member, a boom member, guides on each of said members, an endless articulated conveyor passing about said guides, said boom member being pivoted to the elevator member to swing in a vertical plane in such a manner that the length and tension of the endless conveyor is not affected by such movement, means for raising and lowering the boom at will comprising a manually operated clutch and brake member, and means for holding said boom in any desired position.

6. Loading apparatus comprising an inclined elevator member, a boom member, guides on each of said members, an endless articulated conveyor passing about said guides, said boom member being pivoted to the elevator member to swing in a vertical plane in such a manner that the length and tension of the endless conveyor is not affected by such movement, means for raising and lowering the boom at will comprising a manually operated clutch and brake member, and a pawl and ratchet mechanism for holding said boom in any desired position.

7. Loading apparatus comprising an inclined elevator member, a boom member pivoted thereto to move in a vertical plane, guides on said members, an endless conveyor passing about said guides and turning the same, a normally idle shaft on which one of said guides is mounted, a cable drum splined to said shaft and carrying a cable connected to said boom, a clutch member rigid with said drum, another clutch member carried by said guide, and means for moving said clutch members into engagement to wind said cable from the movement of the endless conveyor.

8. Loading apparatus comprising an inclined elevator member, a boom member pivoted thereto to move in a vertical plane, guides on said members, an endless conveyor passing about said guides and turning the same, a normally idle shaft on which one of said guides is mounted, a cable drum splined to said shaft and carrying a cable connected to said boom, a friction clutch and brake member rigid with said drum, another friction clutch and brake member carried by said guide, and means for moving said clutch members into engagement to wind said cable from the movement of the endless conveyor.

9. Loading apparatus comprising an inclined elevator member, a boom member pivoted thereto to move in a vertical plane, guides on said members, an endless conveyor passing about said guides and turning the same, a normally idle shaft on which one of said guides is mounted, a cable drum splined to said shaft and carrying a cable connected to said boom, a friction clutch and brake member rigid with said drum, another friction clutch and brake member carried by said guide, and manually operated means for controlling the engagement of said clutch members and consequent movement of said boom.

10. Loading apparatus comprising an inclined elevator member, a boom member pivoted thereto to move in a vertical plane, guides on said members, an endless conveyor passing about said guides and turning the same, a normally idle shaft on which one of said guides is mounted, a cable drum splined to said shaft and carrying a cable connected to said boom, a friction clutch and brake member rigid with said drum, another friction clutch and brake member carried by said guide, manually operated means for controlling the engagement of said clutch members and consequent movement of said boom, and means for holding said boom in any desired position.

11. Loading apparatus comprising an inclined elevator member, a boom member pivoted thereto to move in a vertical plane, an endless conveyor mounted upon said members, and comprising toothed rakes alternating with plain scrapers, and means for raising and lowering said boom without affecting the length or tension of the conveyor.

12. Loading apparatus comprising an inclined elevator member, a boom member pivoted thereto to move in a vertical plane, sprocket wheels upon each of said members, an endless conveyor passing about said sprocket wheels, and comprising toothed rakes alternating with plain scrapers, and means for raising and lowering said boom without affecting the length or tension of the conveyor.

13. Loading apparatus comprising an inclined elevator member, a boom member pivoted thereto to move in a vertical plane, sprocket wheels upon each of said members, an endless conveyor passing about said sprocket wheels, and comprising toothed rakes alternating with plain scrapers, and a manually operated clutch and brake device for raising and lowering said boom without affecting the length or tension of the conveyor.

14. Loading apparatus comprising an inclined elevator member, a boom member pivoted thereto to move in a vertical plane, sprocket wheels upon each of said members, an endless conveyor passing about said sprocket wheels, and comprising toothed rakes alternating with plain scrapers, a manually operated clutch and brake device for raising and lowering said boom without affecting the length or tension of the conveyor, and means for retaining said boom in any desired position.

In testimony whereof, I have hereunto subscribed my name.

WALTER KEMMERER.